(12) United States Patent
Banzi

(10) Patent No.: US 6,325,398 B1
(45) Date of Patent: Dec. 4, 2001

(54) MANUALLY OPERATED ERGONOMIC WHEELCHAIR

(75) Inventor: Mario Banzi, Milan (IT)

(73) Assignee: Tecodom di Banzi Mario, Milan (IT)

( * ) Notice: Subject to any disclaimer, the term of this patent is extended or adjusted under 35 U.S.C. 154(b) by 0 days.

(21) Appl. No.: 09/532,520

(22) Filed: Mar. 21, 2000

(30) Foreign Application Priority Data

Mar. 22, 1999 (EP) .................................... 99830161

(51) Int. Cl.⁷ ........................................ B62M 1/14
(52) U.S. Cl. .................... 280/250.1; 280/244; 280/304.1
(58) Field of Search ................................. 280/243, 244, 280/246, 250, 250.1, 304.1, 233, 242.1, 251, 252, 253

(56) References Cited

U.S. PATENT DOCUMENTS

| | | | |
|---|---|---|---|
| 517,697 | * 4/1894 | Hyde | 280/243 |
| 1,459,573 | * 6/1923 | Cleveland | 280/243 |
| 1,607,250 | * 11/1926 | Dyer | 280/243 |
| 3,239,872 | 3/1966 | Kitrell. | |
| 4,453,729 | * 6/1984 | Lucken | 280/250.1 |
| 4,616,840 | * 10/1986 | Green | 280/252 |
| 4,757,868 | * 7/1988 | Cresswell | 280/250.1 |
| 4,886,287 | * 12/1989 | Krause, II et al. | 280/246 |
| 5,228,709 | * 7/1993 | Kao | 280/244 |
| 5,280,936 | * 1/1994 | Schmidlin | 280/244 |

FOREIGN PATENT DOCUMENTS

| | | | |
|---|---|---|---|
| 127929 | * 9/1984 | (EP) | 280/304.1 |
| 935934 | 7/1948 | (FR). | |
| 147989 | 7/1920 | (GB). | |
| 179726 | 5/1922 | (GB). | |
| 2096074 | * 10/1982 | (GB) | 280/250.1 |
| 90/05515 | * 10/1982 | (WO) | 280/250.1 |
| 93/01787 | * 2/1993 | (WO) | 280/250.1 |

* cited by examiner

Primary Examiner—Daniel G. DePumpo
(74) Attorney, Agent, or Firm—Young & Thompson

(57) ABSTRACT

A manually operated ergonomic wheelchair comprises a pair of levers (10) which are pivotably mounted on said wheelchair and can be operated by the user by hand-grips (12) and/or pedals, so as to cause rotation of the wheels (3) of the wheelchair by a chain transmission (14, 19). Each lever (10) has a reciprocating oscillatory movement and has a lower branch (15, 16) in the form of a fork closed by an arched support (13) having a variable distance from the fulcrum (11) of the lever. The transmission consists of a chain section (14) attached to the two arms (15, 16) of said fork, guided by the arc (13) and meshing with a gear wheel (18) located between the arms (15, 16) of the fork. The gear wheel (18) is coplanar with the plane of oscillation of the chain section (14) and is associated, directly or by a train of driven gears (11, 20), with the hub (6) of the wheel (3) of the wheelchair, one of said gear wheels (18, 20) being a freewheel.

12 Claims, 6 Drawing Sheets

MANUALLY OPERATED ERGONOMIC WHEELCHAIR

BACKGROUND OF THE INVENTION

The present invention relates to a manually operated ergonomic wheelchair and in particular to a wheelchair designed to enable, during operation, the user to maintain an upright posture, moreover encouraging his or her proportioned physical development. Said wheelchair is also particularly suitable for sporting use, even on rough or sloping ground.

Known wheelchairs currently available on the market can be divided into two major categories according to the type of operating system, namely wheelchairs with an electrical or manual operating system. In this second category, which includes the present invention, it can been seen how the more traditional type of manual wheelchair operating system, i.e. that consisting of two metal rings fixed laterally to the wheels which the user can operate by pushing directly with his or her hands, has remained basically the only one in widespread use, thanks to its practical and economical nature, ease of use and minimal bulk. In contrast to these advantages, an operating system of this type does however have important functional disadvantages, from the point of view of the user, relating to the very poor ergonomics of the movements which the user has to perform for its operation. An upright position of the user during the pushing phase is in fact only possible (but definitely not facilitated) during limited transit in an apartment, due to the fact that, on account of the short travel paths and low rolling friction, it is possible to restrict the movement of the hands gripping the pushing rings to a few centimetres. In all other cases—and in particular in outdoor uses, and in the sporting uses which are becoming increasingly widespread among young disabled persons—acceptable power of movement and travel speed can only be achieved at the cost of considerably lengthening the gripping travel length of the hands on the rings, for example up to at least a quarter of the entire circumference of the rings. In order to achieve this long gripping travel length, the user must necessarily adopt an extremely curved position of the torso, with negative effects both on the potential thrust, which is small compared to the full capability of the user in an upright position, and on the permanent deformation of the torso caused by constant adopting of this posture.

Alternative solutions to the traditional one, also of the type with jointed levers or with a chain transmission, have been proposed in the art, without however any of them, due to problems both of high cost and mechanical complexity, having ever found favour with users and, as a result, appreciable growth on the market.

SUMMARY OF THE INVENTION

The object of the present invention is therefore that of providing a manually operated ergonomic wheelchair which enables the user to develop his or her propulsive power in full, nevertheless maintaining a posture which is constantly upright and therefore physically correct and psychologically pleasing, without having to sacrifice the operating flexibility which is typical of the manual ring-type operating system of known wheelchairs.

Another fundamental object of the invention is that of providing a manual wheelchair operating system of the progressive type, that is to say provided with the possibility of varying the ratio between the force applied and working thrust on the wheelchair, so as to facilitate use of the wheelchair both on rough and sloping ground.

The characteristic feature indicated above makes the wheelchair according to the present invention particularly interesting for sporting use by young disabled persons, and a further object of the invention is therefore that of providing a wheelchair having excellent properties of starting thrust, manoeuvrability and safety, even on rough or sloping ground.

Yet another object of the invention is that of providing a wheelchair of the type mentioned above which is fitted with devices for travel, in an easy and autonomous manner, over steps and other obstacles.

A further object of the invention is also that of providing a suspension system for the wheelchair of the non-rigid type, capable of effectively cushioning the impacts arising from the aforesaid sporting use of the wheelchair.

A last, but nonetheless equally important, object of the invention is that of achieving the results mentioned above with a mechanical structure which has a simple and therefore reliable design, also suitable for allowing easy dismounting so as to facilitate transport of the wheelchair in a motor vehicle.

The objects indicated above are achieved, according to the present invention, by means of a manually operated ergonomic wheelchair having the characteristic features stated in the characterizing portion of claim 1.

BRIEF DESCRIPTION OF THE DRAWINGS

Further characteristic features and advantages of the wheelchair according to the present invention will in any case emerge more clearly from the following detailed description of one of its embodiments, given with reference to the accompanying drawings, in which.

DESCRIPTION OF THE PREFERRED EMBODIMENTS

Figure 1:
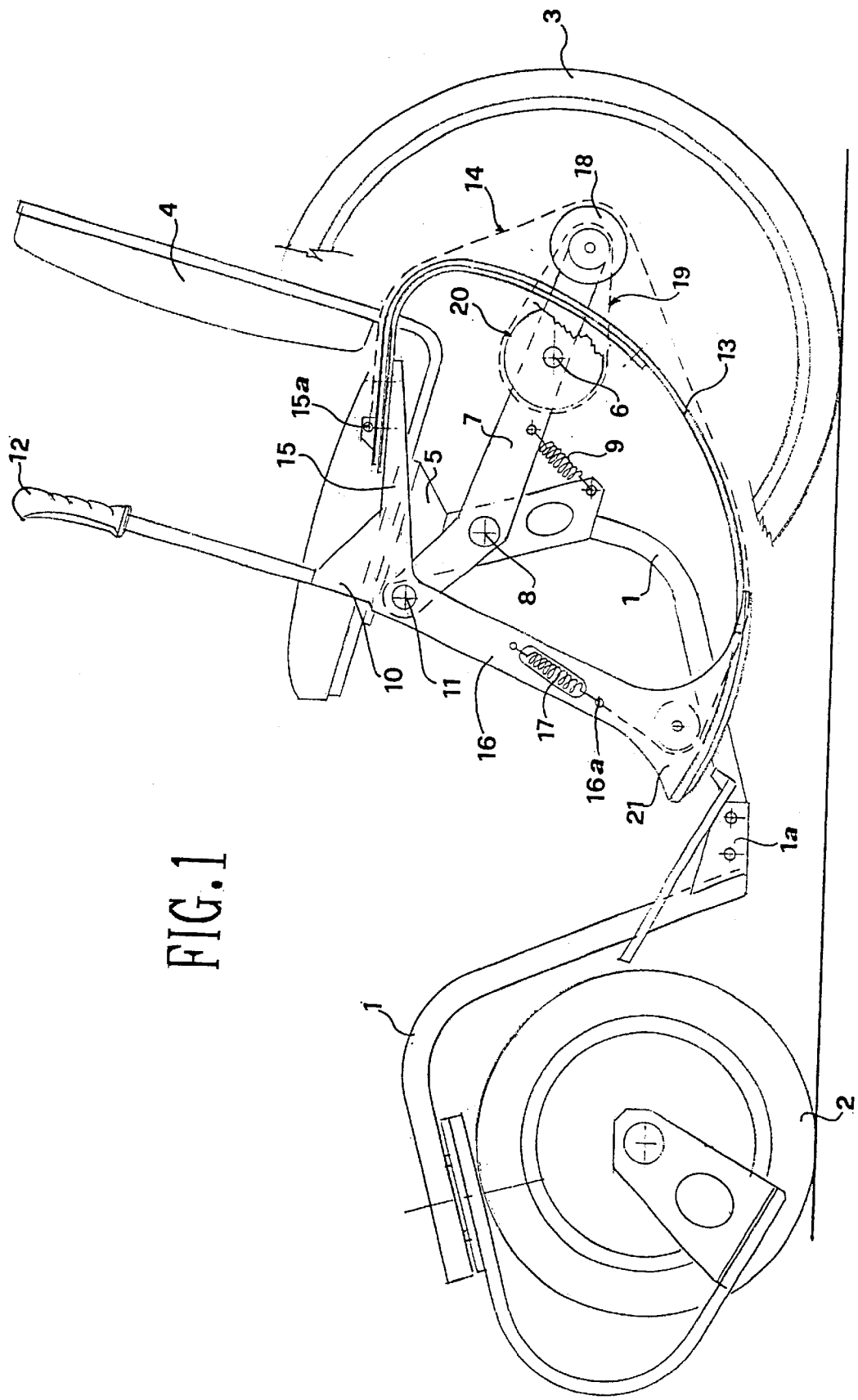
FIG. 1 is a schematic view, in side elevation, of the wheelchair according to the present invention.

The embodiment of the wheelchair according to the present invention, shown in the drawings, concerns a three-wheeled wheelchair for sporting use, that is to say in which the pair of rear driving wheels is associated with a single front steering wheel which can be operated, in a manner in itself known, by the user. Obviously, even if in the description reference will be made solely to this type of wheelchair, the manual operating system according to the present invention can also be applied equally successfully to wheelchairs with a traditional structure, i.e. provided with a pair of small, self-directing front wheels, which are very convenient and practical to use in closed spaces. A preferred version of the wheelchair according to the present invention in fact envisages the possibility of making the chassis of the wheelchair separable, at a central zone, so as to be able to detach the single front wheel from the rear part of the wheelchair, then attaching thereto the pair of small steering wheels. This wheelchair version therefore offers maximum versatility, allowing the user both outdoor use, even on long and rough routes, and use in closed spaces, such as apartments, offices and public meeting places.

The general structure of the wheelchair according to the present invention is shown in FIG. 1. It comprises a chassis 1 which can be dismounted at 1*a* so as to separate the front part from the rear part of the wheelchair, both for the reasons already described above and for greater ease of transport. A steering wheel 2 has, attached to it, the chassis 1 at the front and the pair of driving wheels 3 and the seat 4, at the rear. While the seat 4 is attached directly to the chassis 1, obviously with a suitable springing system 5 arranged in between, the hub 6 of the wheels 3 is preferably attached to a rocker arm 7, hinged at 8 with the chassis 1 and restrained elastically thereto by spring means 9, if necessary with an adjustable load. This arrangement enables greater travel comfort to be achieved, both during normal travel and when Obstacles are being negotiated, as will be illustrated in greater detail below. The use of the rocker arm 7 is not however essential for operation of the wheelchair, and for example in FIG. 2 an embodiment of the wheelchair is shown without this component, and therefore with a simpler structure, suitable for use on even ground.

The manual operating system of the wheelchair according to the present invention is formed by two symmetrical and independent assemblies, attached to the right wheel and to the left wheel of the wheelchair respectively. Below, for greater simplicity, this system will be described solely with reference to the left wheel of the wheelchair, shown in the drawings, it being understood that a wholly similar structure is provided on the right wheel. Each assembly of the manual operating system therefore comprises a rigid lever 10, hinged at 11 or directly to the chassis 1, in the version without a rocker arm shown in FIG. 2, or to the end of the rocker arm 7 opposite that which carries the wheels 3, in the version with rocker arm shown in FIG. 1. The upper branch of the lever 10 ends with a hand-grip 12 and may have the simple rectilinear form shown in the drawings, or a varyingly arched or shaped form to allow comfortable operation thereof by the user and, at the same time, allow easy access by the latter to the seat 4. The lower branch of the lever 10 consists instead of a fork structure with two arms 15 and 16, the first of which lies substantially horizontally and the second substantially vertically. Said fork structure is then closed by an arc 13, the special shape of which will be defined in greater detail below.

An open extension chain 14 is attached to the lower branch of the lever 10 so as to rest, during the oscillating movement of the lever 10, on the external part of the arc 13. More specifically, the active end of the chain 14 is attached stably at 15*a* to the horizontal side 15 of the fork structure, while the inactive end of said chain is attached at 16*a* to a system 17 for elastic recovery of the chain, housed in the vertical side 16 of said fork structure and suitable for compensating for the variations in length of the pitch line of the chain transmission—i.e. the envelope line of the chain 14 on the arc 13 and on a gear wheel 18 on which it engages—during oscillation of the lever 10, keeping it at the same time at the required degree of tension.

With its open extension, the chain 14 in fact engages on one of the two gear wheels of a pinion 18 with a double crown, attached, freely in rotation, to the end of the rocker arm 7, or of an appropriate extended part of the chassis 1 should the rocker arm 7 not be provided, the other gear wheel of which being connected in rotation, by means of a chain 19, to a gear wheel 20 fixed and coaxial to the wheel 3. The gear wheel 20, or alternatively one of the two gear wheels of the pinion 18, is a freewheel, so as to release the movement of the wheels 3 from that of the chain 14 and hence of the lever 10. The freewheel is preferably positioned on the pinion 18; in this way, in fact, it is possible to provide a single type of pinion 18, both for the right wheel and for the left wheel, using commercial freewheels (now all of the right-hand type) to the full benefit of a reduction in the costs of manufacture and of the number of spare parts. This arrangement obviously would not be possible if the freewheel were however provided on the gear wheel 20; in this case, in fact, given the practical impossibility of arranging the gear wheel 20 inside the wheel 3, it would be necessary to provide two different types of freewheel, right and left respectively.

The diameter of the two gear wheels of the pinion 18 and their coupling to the chains 14 and 19 is chosen according to the required gearing-up or gearing-down ratio which is to be obtained between stroke of the lever 10 and movement of the gear wheel 20, and therefore also depends on the type of use which is to be made of the wheelchair and of the greater or lesser physical capability of its user. According to the present invention, it is envisaged that the pinion 18 is attached to the chassis 1, or to the rocker arm 7, by fast-attachment systems, so that it can be rapidly replaced with pinions having various ratios, so as to be able to adapt the wheelchair rapidly to various types of travel path. For this reason the hole for housing the pin of the pinion 18 will preferably be an elongated hole, so that during assembly and disassembly of the pinion 18 it is also possible to adjust the tension of the chain 19.

As can be seen in FIG. 1, the vertical side 16 of the fork structure which forms the lower branch of the lever 10 has a decidedly wider section than the horizontal side 15 of the same structure and terminates at the bottom in a widened foot 21, arched in such a way as to be perfectly radiused to the arc 13. The foot 21, according to the present invention, constitutes a device for facilitating the negotiation of obstacles by the wheelchair and its operation will be explained hereinbelow, with special reference to FIG. 5.

Figure 2:
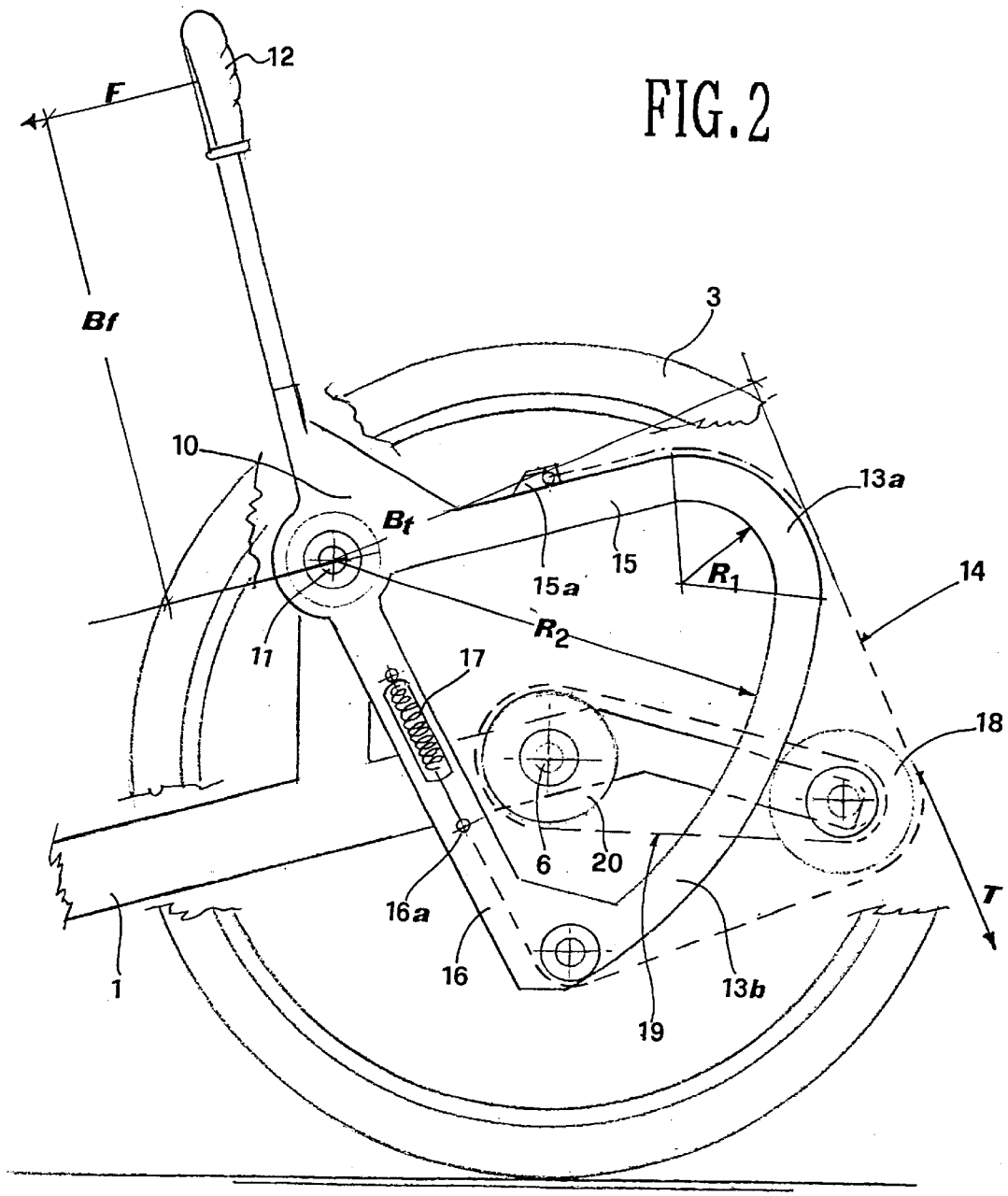
FIG. 2 is a schematic view, in side elevation and on a larger scale, of a detail of the rear wheel of the wheelchair, in which the manual operating system is shown.
Figure 3:
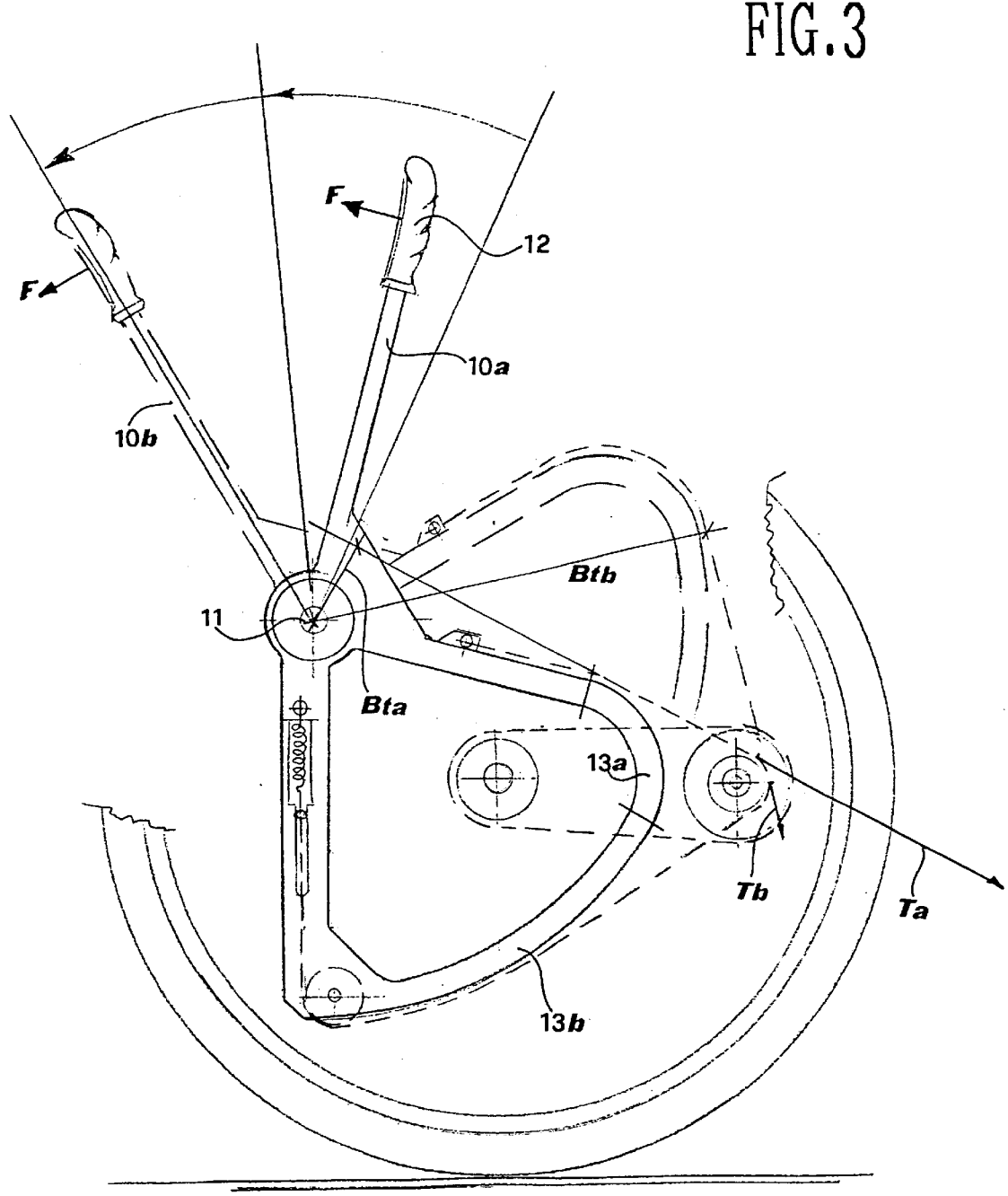
FIG. 3 is a schematic view similar to FIG. 2, which shows two different positions of the manual operating system.

FIGS. 2 and 3 show, in greater detail and schematically, operation of the manual operating system of the wheelchair according to the present invention. In FIG. 2 it can be seen that the points of the arched side 13 have increasing distances from the fulcrum 11 of the lever 10, in the direction along the arc 13 from the top downwards. In the embodiment shown, the arc 13 comprises for example a first circular lobe section 13*a* with radius R1, characterized therefore by progressively increasing distances from the fulcrum 11, and a second longer end section, also circular and with radius R2, having a constant distance from the fulcrum 11. Other types of curvature can be used according to the present invention, for example by adopting a distance from the fulcrum 11 which varies gradually along the entire arc 13, the essential factor being that there is an upper section of the arc 13 having a distance from the fulcrum 11 substantially shorter than the—preferably constant—distance which characterizes the lower end section of the same arc. This special configuration of the arc 13 in fact produces, for the same thrust exerted by the user on the lever 10, a considerably different force on the chain 14, and hence on the wheels 13, according to the angular position of the lever 10.

As can in fact be seen in FIG. 3, as the tension T of the chain has a value proportional to the thrust F, exerted by the user on the hand-grip 1 2, according to the known law of equilibrium of the moments about the fulcrum 11, the following relation can be written:

$T.B_t = F.B_f$ and therefore $T = F.B_f/B_t$ where $B_f$ and $B_t$ are the arms of the thrust F and of the tension T, respectively, with respect to the fulcrum 11.

As can be clearly seen from FIGS. 2 and 3, the arm $B_f$ has a substantially constant value during oscillation of the lever 10, with the possibility of minor variations according to the effective direction of thrust exerted by the user which, in the drawings, is always assumed to be perpendicular to the lever 10. On the contrary, the arm $B_t$, during the same oscillation of the lever 10, undergoes considerable variations and, more specifically, assumes minimum values when the lever is in the retracted position and maximum values when the lever is in the forward position. When the lever 10 is, in fact, in its retracted position 10a (indicated by a continuous line in FIG. 3), the chain 14 rests on the section 13a of the arc 13 at a shorter distance from the fulcrum 11 and therefore the arm $B_t$ has a value $B_{ta}$ which is much lower than that of the arm $B_f$. As a result the tension T necessarily assumes a value $T_a$ which is much higher than the thrust F. When however the lever 10 is in the forward position $10_b$ (indicated by a broken line in FIG. 3), the chain 14 rests on the section 13b having a greater distance from the fulcrum 11 and the arm $B_t$ assumes a value $B_{tb}$ substantially similar to that of the arm $B_f$. As a result the tension T on the chain, for the same thrust F, assumes a value $T_b$ which is substantially equal to that of said thrust F. The position $10_a$ for the end of backward movement of the lever 10 will therefore be situated preferably in the zone in which the chain 14, or rather its upper section, is nearly in alignment between the fulcrum 11 and the periphery of the gear wheel 18 on which the chain 14 is engaged, i.e. in a zone in which the arm Bta approaches zero.

With the manual operating system described above, the user therefore has available an immediate and self-evident possibility of changing the ratio between force exerted on the levers 10 and thrust developed on the driving wheels 3. When working in fact in the retracted zone of the levers 10 and therefore in a position close to the chest, the chain 14 is tangential to the section 13a of the arc 13 and therefore the user manages to produce the maximum thrust on the wheels, obviously in contrast to a low speed of the wheelchair. This situation is therefore ideal during starting from standstill, particularly on uneven ground, or during ascent or where there are obstacles. When working, however, in the forward zone of the levers 10, the chain 14 is tangential to the section $13_b$ of the arc 13, the arm $B_t$ increases and therefore the thrust transmitted to the wheels is reduced and the speed of winding of the chain 14 on the pinion 18 is proportionally increased together with the speed of the wheelchair too. This is therefore the ideal situation for fast travel on flat ground. The performances of the manual operating system according to the present invention can obviously be changed by modifying the shape of the arc 13. It will thus be possible to provide wheelchairs more suitable for travel paths with many obstacles and upward slopes, where the arc 13 has a substantial part with a smaller distance in relation to the fulcrum 11, or wheelchairs more suitable for fast travel paths characterized by limited obstacles and upward slopes, where the part of the arc 13 with a smaller distance is restricted to an end portion, so as to leave almost all the movement of the levers 10 available for fast travel.

It is interesting to note that the change from one thrust situation to another is wholly gradual and does not entail the use or activation of any specific mechanism or any other operation apart from simple use of the lever 10 in the required thrust sector. Also, owing to the presence of the freewheels on the pinions 18, the position of the levers 10 can be moved in the retracted position at any time and at the user's discretion. This means that, as soon as the user needs greater thrust, for example due to an unexpected obstacle or upward slope, he or she has an immediate access thereto by moving one or both of the levers 10 backwards into the position 10a and continuing to operate said levers in a small zone around this position. The operating system according to the present invention thus results in an operating mode of the wheelchair which has a marked similarity with the "step" of a walker, whose length or rate can be adjusted as necessary in a natural manner to the features of the ground and to the possible presence of obstacles.

It should also be noted that the two levers 10 are entirely independent in their movement and also that each of them, during its forward stroke, has a continuously active operation, i.e. without dead points which are instead to be found in the traditional systems of connecting rod and crank lever mechanisms. It is therefore possible for the user, according to his or her personal preferences or the type of activity which he or she is performing, to work with paired or alternate levers 10 and to change, as required and depending on the state of the travel path, the end point of the stroke of the levers 10, both in the retracted and forward positions.

In the case of hemiplegic users, it is also possible, according to the invention, to envisage operation of one of the levers 10 being performed by means of the user's foot, by appropriately modifying the shape of this lever so that the same can be actuated by a pedal in place of the hand-grip 12. This pedal must obviously be housed in the front part of the chassis of the wheelchair and connected to the respective lever 10 by means of a jointed rod or cable transmission system, the design of which is obvious for an expert in the art, so that the pedal is positioned on the same side of the wheelchair as the hand-grip 12 of the other lever 10.

Directional steering of the wheelchair is performed by a system for steering the wheel 2, of the type in itself known and therefore not shown in detail, for example of the wire type, which is preferably associated with one of the hand-grips 12, so that the user can maintain the required direction of the wheelchair without the need to remove his or her hands from the levers 10. The total independence of the two levers 10, and consequently of the thrust exerted on the wheels 3, on the other hand enables the steering action to be helped, for example by acting on only one of the two wheels so as to facilitate right entering in a bend by the wheelchair, or by increasing the action on one of the two levers in relation to the other so as to keep a straight path without adjusting the steering. The braking functions are also performed in the manner widely known in the cycling sector, by providing the two rear wheels with brakes with a paired wire control system, said control system preferably being associated with whichever of the two hand-grips 12 does not have the steering control system.

Figure 4:
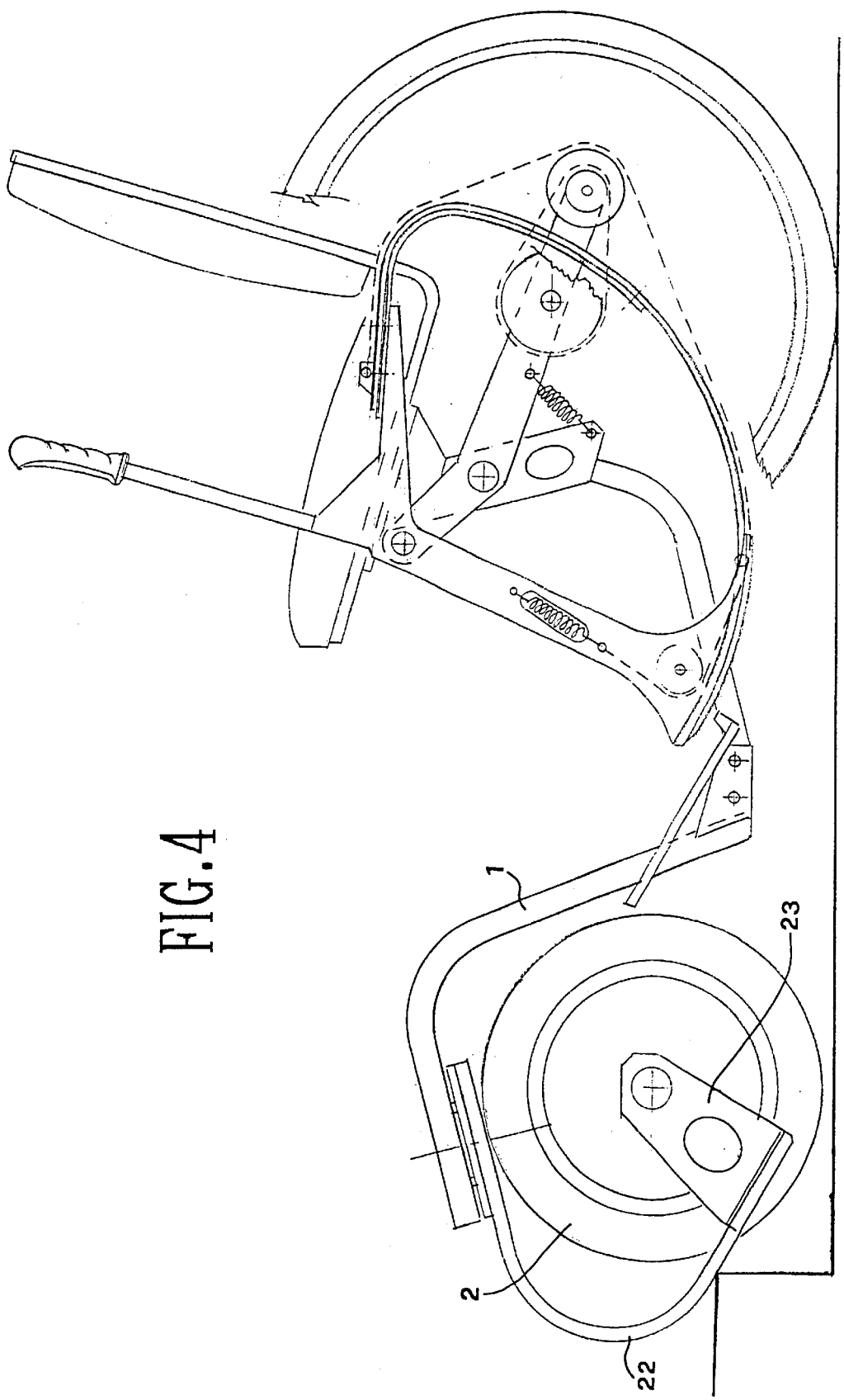
FIG. 4 is a schematic view similar to FIG. 1, which shows negotiation of an obstacle by the front wheel.
Figure 5:
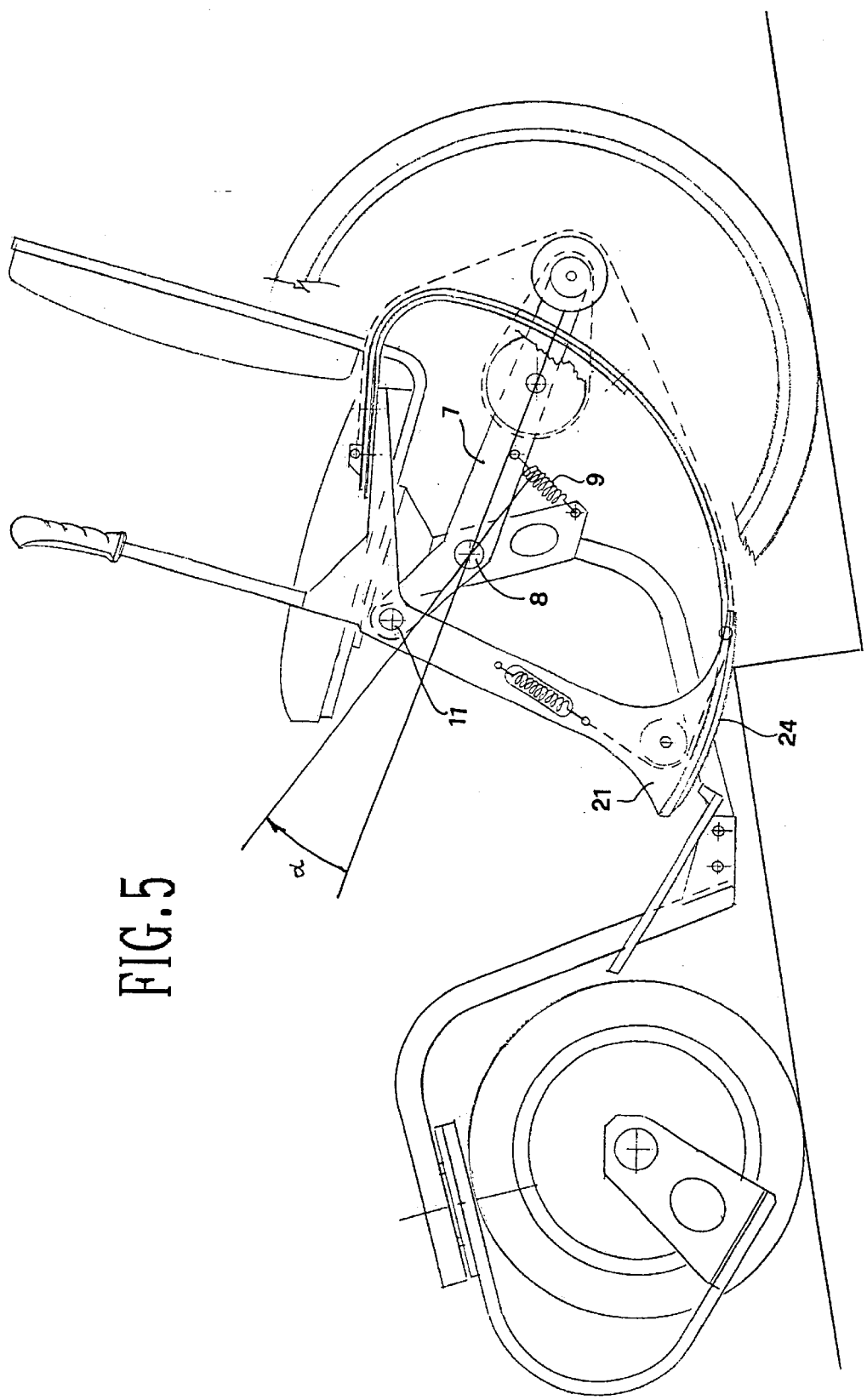
FIG. 5 is a schematic view similar to FIG. 2, which shows negotiation of an obstacle by the rear wheels.

The wheelchair according to the present invention, also in view of the sporting applications for which it can be favourably used, is provided with advanced systems for easy negotiation of obstacles—both natural and artificial—which may be encountered along the travel path. FIGS. 4 and 5 illustrate the method of negotiating a typical step-like obstacle, which is definitely one of the most difficult obstacles to negotiate. Since any form of ramp is in fact lacking therein, should its height be greater than $\frac{1}{5}$th of the height of the wheel, there is a considerable impact effect even at low speeds. This impact effect, in addition to reducing comfort for the user, can easily lead to losses of balance or direction of the wheelchair and therefore must be eliminated as far as possible.

For this reason the wheelchair according to the present invention has two different devices for negotiating obstacles, intended for the front wheel 2 and for the rear wheels 3, respectively. In the case of the front wheel 2, on which only a small portion of the wheelchair weight bears, the device for negotiating obstacles consists of the same system for supporting the wheel. This in fact comprises an arched bracket 22 which is made of steel and connected at the top to the chassis 1 by means of a bearing system which allows rotation thereof and which is also divided into two branches, each of which is integrally joined to a respective plate 23 on which the hub of the wheel 2 is hinged. Each branch of the bracket 22 has a horizontal V shape, the vertex of which extends in front of the wheel 2, so as to form a slide for climbing over obstacles, as shown in FIG. 4. The obstacle is thus brought into contact with the wheel 2 only at a height lower than approximately ⅕th of the wheel itself, thus making negotiation thereof very easy. Alternatively, where preferable for driving safety, the bracket 22 can also be attached directly to the chassis 1 and thus made independent of the system for steering the wheel 2.

Thanks to its shape and the material from which it is made, the bracket 22 has high elasticity, so that the impact with the obstacle is considerably cushioned. This elasticity can be increased further by forming each V-shaped branch of the bracket 22 with a full turn at the vertex, thus causing an actual springing effect when negotiating obstacles. The elasticity due to the material and shape of the bracket 22 does not only allow absorption of the vertical stresses caused by negotiation of obstacles, but also allows to absorb the horizontal stresses caused by impact against obstacles which cannot be negotiated, thus performing a bumper function.

Finally, the passive safety of the wheelchair according to the present invention can be increased further by designing the front part of the chassis with a structure having progressive elasto-plastic deformation, which allows the energy of any front impacts of a significant nature to be absorbed, without affecting or affecting only marginally the rear part of the chassis of the wheelchair where the user is seated. Other known passive safety systems, such as for example the fitting of a casing for protecting the legs of the user and safety belts for restraining the user's torso to the seat, can be usefully provided, especially when the wheelchair is intended for strictly sporting use.

As regards the rear wheels 3, negotiation of the obstacle is facilitated thanks to the presence of the negotiating foot 21. The position of this foot in fact enables the same to rest with its sole 24, suitably reinforced and covered with a non-slip material, on the edge of the step, against which it is thus grips, causing both a static lightening of the load on the wheels 3, given that the weight of the wheelchair now bears partly also on the foot 21, and an additional driving forwards of the wheelchair, particularly useful in the case of limited adherence of the wheels 3 to the ground, and thus considerably facilitating negotiation of the obstacle. In actual fact, the mechanical work of raising the rear part of the wheelchair, burdened by the weight of the user, is performed over a horizontal distance which is longer than that which would be obtained without the foot 21, given that the raising action starts well before the wheel 3 comes into contact with the obstacle, as is clear from looking at FIG. 5. Where the obstacle is negotiated at low speed, the negotiating action with the feet 21 must be controlled directly by the user, by acting on the levers 10. Should, however, the obstacle be negotiated during fast travel, the energy for negotiation will be provided wholly or partially by the kinetic energy of the vehicle and the user only has to arrange the feet 21 in a forward position before tackling the obstacle.

The comfort of the user during negotiation of the obstacle is ensured by the presence of the rocker arm 7 which, during negotiation of the obstacle, cushions the impact, reducing the vertical component thereof, thanks to the fact that it rotates about the fulcrum 8 through an angle a and acts so that the immediate raising of the foot corresponds to a more gradual raising of the chassis 1 and hence of the seat 4. During this operation the spring 9 is partially untensioned, until the wheels 3 come into contact with the step. Beyond this point the foot 21 is gradually released and the static load on the wheels 3 is progressively restored. During this second step, the contrary rotation of the rocker arm 7 takes place, cushioned by the action of the spring 9 which recompresses, while the wheelchair returns to the original position of resting on the three wheels. By calibrating the spring 9 to different values, it is possible not only to take account of the weight of the specific user but also to adjust the height from the ground of the foot 21 according to the different types of travel. A lower height may thus be used for high-speed travel paths without obstacles or with obstacles which are low in height, also achieving greater stability of the wheelchair thanks to the lowering of its centre of gravity. A greater height will however be preferable on rougher travel paths, along which it becomes important to overcome obstacles also of greater height.

Obviously, so that the obstacle is negotiated in the best possible way, it is preferable for the user, immediately prior to the obstacle, to bring both levers 10 into the retracted position, so that the entire stroke of said lever is available for negotiating the obstacle. It is clear in fact that, once the foot 21 has engaged the obstacle, the user does not have the possibility of repositioning the corresponding lever 10 in the retracted position, until the wheel 3 has completely negotiated the obstacle, consequently freeing the foot 21.

Figure 6:
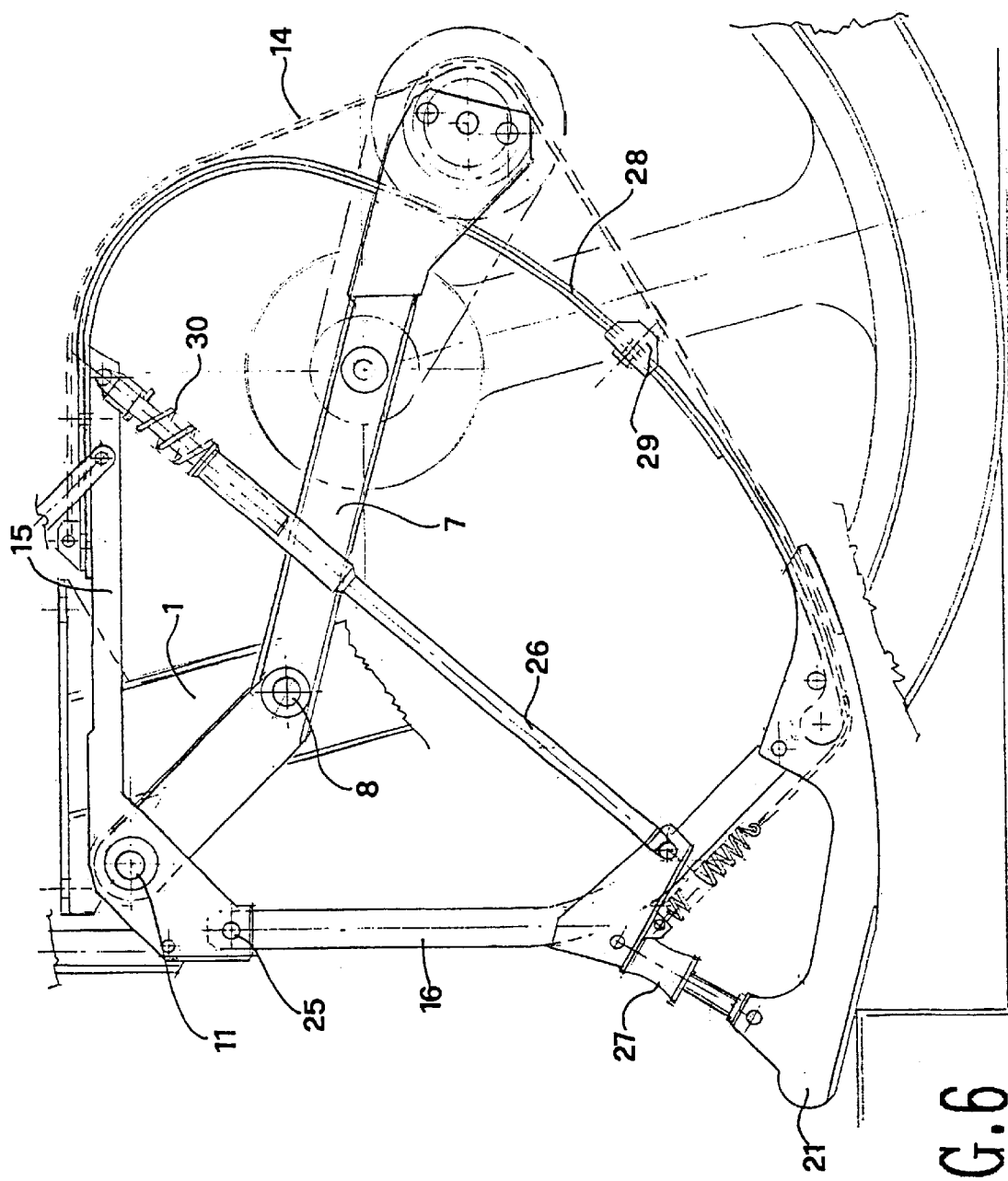
FIG. 6 is a detail on a larger scale which shows the mechanical structure of the manual operating system.

The rocker arm system described above enables direct transmission of the impacts to the chassis 1 and therefore to the seat 4 to be avoided. However, the hand-grips 12 are directly connected to the feet 21 and it is therefore preferable to provide additional systems for elastic absorption of the impact so as to avoid excessive tiring of the upper limbs of the user. FIG. 6 therefore illustrates a possible constructional solution of the fork structure, in which said systems for elastic impact absorption are provided.

In this figure it can be noted above all that the two straight sides 15 and 16 of this fork structure do not form a rigid system, but are mutually hinged at 25 and kept in the required position by a push rod 26, hinged therewith at their ends. The push rod 26 is of the type with a length which is variable, for example by means of a telescopic structure, and its changes in length are opposed by spring means 30. The latter, in addition to cushioning the impact, absorbing the kinetic energy thereof in the form of elastic energy, then re-transmit this energy in the form of a rotational impulse to the operating system of the wheelchair, with an effect comparable to that which occurs in high-jumping. The foot 21 is also connected to the vertical side 16 of the fork structure via a resilient buffer 27. Finally, the arched side 13 which closes the fork structure is preferably formed by a leaf spring 28, which is pressed in the required shape and is capable, by its elastic deformation, of ensuring a further degree of freedom for the foot 21 during impact against an obstacle. One or more guide blocks 29 may be provided along the leaf spring 28 in order to keep the chain 14 in a correct position during movement of the levers 10.

It is clear from the above description how the wheelchair according to the present invention has achieved the required objects in full. Thanks to the manual operating system described above, it is possible to maintain an upright position for the user, who can apply his or her energy with an alternating or combined movement of the arms, correctly discharging the reaction forces thanks to the spine resting fully against the backrest. This position can also be varied as required during travel, if necessary by adjusting the position of the backrest, in order to work in a more retracted or more forward operating zone of the levers 10, both so as to modify the ratio between force applied and working thrust and so as to simply reduce fatigue. This is therefore a highly ergonomic position, i.e. one which allows the maximum physical potential of the user to be expressed with minimum fatigue and excellent results to be achieved in terms of physical fitness.

The manual operating system described above also achieves that versatility of use which is essential in sporting use of the wheelchair. In fact, the possibility of operating only one or both levers 10, in a mutually independent manner and in any position, allows the user the same flexibility of use as the present wheelchairs with a metal-ring operating system. Moreover, the possibility of graduating as required the ratio between force applied and working thrust, by simply selecting the operating zone for the stroke of the levers 10, allows the user to negotiate with agility and at speed obstacles and upward slopes, including steep slopes, and at the same time reach more than satisfactory speeds along clear and flat travel paths, as well as adapt the force exerted to his or her specific psycho-physical and fitness conditions.

The object of allowing easy negotiation of steps and other obstacles has also been brilliantly achieved by the wheelchair according to the present invention. Thanks to the special configuration of the front wheel and the presence of the negotiating feet 21, obstacles which could not conceivably be negotiated with a traditional wheelchair without the aid of a third person, can be negotiated in an easy and autonomous manner.

The safety and comfort of the user, also when travelling over rough surfaces, are instead ensured by the presence of the rocker arm system and the other systems for elastic cushioning of the impacts described above, which allow gradual absorption of the impact energy and its partial elastic recovery useful for the purposes of negotiating the obstacle, preventing the said energy from being transmitted directly to the body or to the limbs of the user.

The wheelchair according to the present invention also successfully achieves the last of the objects mentioned. It in fact has a very simple and compact structure and can easily be dismounted with few operations. The front part of the chassis with the wheel 2 is in fact separated from the rear part at 1*a*, while the manual operating systems are dismantled from the latter as single-unit assemblies, simply by disengaging from the chassis 7 the rocker arm 7 and, hence, all the other parts of the manual operating system fixed thereto, namely the lever 10, the pinion 18, the chains 14 and 19, the gear wheel 20 and the wheel 3.

The invention has been described with reference to a preferred embodiment thereof, but it is clear that numerous variations, within the knowledge of a person skilled in the art, may be made thereto, all of which falling within the scope of the invention, as defined in the attached claims.

What is claimed is:

1. A manually operated ergonomic wheelchair comprising:
    a lever pivotally mounted on the wheelchair and connected to a chain transmission that drives a wheel of the wheelchair, said lever having a reciprocating oscillatory motion, said lever comprising a fork with two branches that are connected at radially outward ends by an arched support that comprises an elastic leaf spring made of steel;
    said chain transmission comprising a chain with free ends that are each attached to a respective one of said two branches and that rides on said arched support during the oscillatory motion; and
    a chain of gear wheels attached to a hub of the driven wheel of the wheelchair between and radially outward from said two branches, one of said gear wheels being a freewheel and a further one of said gear wheels being in a plane of oscillation of said chain and driven by said chain.

2. A manually operated ergonomic wheelchair comprising:
    a lever pivotally mounted on the wheelchair and connected to a chain transmission that drives a wheel of the wheelchair, said lever having a reciprocating oscillatory motion, said lever comprising a fork with two branches, one of said two branches being hinged near a fulcrum of said lever;
    a push rod hinged at ends of said two branches, said push rod having a variable length in opposition to a spring that urges said hinged one of said two branches to a position;
    said chain transmission comprising a chain with free ends that are each attached to a respective one of said two branches; and
    a chain of gear wheels attached to a hub of the driven wheel of the wheelchair between and radially outward from said two branches, one of said gear wheels being a freewheel and a further one of said gear wheels being in a plane of oscillation of said chain and driven by said chain.

3. A manually operated ergonomic wheelchair comprising:
    a lever pivotally mounted on the wheelchair and connected to a chain transmission that drives a wheel of the wheelchair, said lever having a reciprocating oscillatory motion, said lever comprising a fork with two branches that are connected at radially outward ends by an arched support;
    said chain transmission comprising a chain with free ends that are each attached to a respective one of said two branches and that rides on said arched support during the oscillatory motion;
    a chain of gear wheels attached to a hub of the driven wheel of the wheelchair between and radially outward from said two branches, one of said gear wheels being a freewheel and a further one of said gear wheels being in a plane of oscillation of said chain and driven by said chain,
    said arched support having an arcuate section in which a radial distance from a fulcrum of said lever increases so that a moment arm of said chain with respect to said fulcrum is a minimum when said lever is in a full retracted position of the oscillatory motion and a maximum when said lever is in a full forward position of the oscillatory motion.

4. The wheelchair of claim 3, wherein an entirety of said arched support has an increasing radial distance from said fulcrum.

5. The wheelchair of claim 3, further comprising a spring connecting said chain to one of said two branches.

6. The wheelchair of claim 3, wherein said arched support comprises an elastic leaf spring made of steel.

7. The wheelchair of claim 3, wherein one of said two branches is hinged near a fulcrum of said lever and further comprising a push rod hinged at ends of said two branches, said push rod having a variable length in opposition to a spring that urges said hinged one of said two branches to a position.

8. The wheelchair of claim 3, wherein said arcuate section is nearer a gripped distal end of said lever than a remainder of said arched support.

9. The wheelchair of claim 3, wherein said lever is pivotally mounted on a chassis of the wheelchair.

10. The wheelchair of claim 3, wherein said lever is pivotally mounted on an end of a rocker arm, said rocker arm being pivotally mounted on a chassis of the wheelchair, said chain of gears and the driven wheel of the wheelchair being mounted on another end of said rocker arm.

11. The wheelchair of claim 3, wherein one of said two branches is generally vertical and has a negotiating foot at a bottom thereof.

12. The wheelchair of claim 3, comprising two of the driven wheels and two of said lever, each of said driven wheels being driven by a respective one of said two levers.

* * * * *